(12) United States Patent
Carro

(10) Patent No.: US 7,644,280 B2
(45) Date of Patent: Jan. 5, 2010

(54) METHOD AND SYSTEM FOR LINKING CERTIFICATES TO SIGNED FILES

(75) Inventor: Fernando Incertis Carro, Valencia (ES)

(73) Assignee: International Business Machines Corporation, Armonk, NY (US)

( * ) Notice: Subject to any disclaimer, the term of this patent is extended or adjusted under 35 U.S.C. 154(b) by 299 days.

(21) Appl. No.: 10/596,244

(22) PCT Filed: Mar. 2, 2005

(86) PCT No.: PCT/EP2005/050925

§ 371 (c)(1),
(2), (4) Date: Jun. 6, 2006

(87) PCT Pub. No.: WO2005/098566

PCT Pub. Date: Oct. 20, 2005

(65) Prior Publication Data

US 2007/0168657 A1    Jul. 19, 2007

(30) Foreign Application Priority Data

Apr. 8, 2004   (EP)   ................................. 04368024

(51) Int. Cl.
*H04L 9/32* (2006.01)
*H04L 29/00* (2006.01)
*G06F 12/00* (2006.01)
*G06F 17/30* (2006.01)
*G06F 7/00* (2006.01)

(52) U.S. Cl. ....................... 713/176; 713/155; 713/156; 713/168; 713/175; 707/2; 707/205

(58) Field of Classification Search ................. 713/176, 713/160, 161, 155, 156, 168
See application file for complete search history.

(56) References Cited

U.S. PATENT DOCUMENTS 7,395,426 B2 *   7/2008   Lee et al. .................... 713/168

(Continued)

FOREIGN PATENT DOCUMENTS

EP         0 813 132       12/1997

(Continued)

OTHER PUBLICATIONS

Helpfile of Vers. Ion 2.0 of MP3 Tag Clinic, 'Online!'; Feb. 10, 2004; pp. 1-29 XP-002334789.

(Continued)

*Primary Examiner*—Syed A. Zia
*Assistant Examiner*—Sarah Su
(74) *Attorney, Agent, or Firm*—Schmeiser, Olsen & Watts; William H. Steinberg

(57) ABSTRACT

A method for processing a file having an existing filename. A private key associated with a digital certificate and a certificate address from which the digital certificate may be accessed are received from a certification authority (CA) who issued the digital certificate. A digital signature is generated based on the file and the received private key. The digital certificate includes a public key associated with the private key such that the generated digital signature can be verified through use of the public key. The file is signed with the generated digital signature The received certificate address is encoded to generate an encoded address. The existing filename and the encoded address are merged to generate a new filename. The file is renamed with the new filename. The renamed file may be authenticated by verifying the digital signature via execution of an authentication algorithm in conjunction with the public key.

18 Claims, 6 Drawing Sheets

U.S. PATENT DOCUMENTS

| | | | |
|---|---|---|---|
| 2001/0020272 | A1 | 9/2001 | Le Pennec et al. |
| 2002/0129256 | A1* | 9/2002 | Parmelee et al. ............ 713/180 |
| 2003/0074555 | A1* | 4/2003 | Fahn et al. ................. 713/156 |
| 2003/0088783 | A1* | 5/2003 | DiPierro ..................... 713/189 |
| 2004/0088360 | A1* | 5/2004 | Caughey ..................... 709/206 |
| 2005/0005097 | A1* | 1/2005 | Murakawa .................. 713/156 |
| 2005/0097114 | A1* | 5/2005 | Carro .......................... 707/100 |
| 2005/0188203 | A1* | 8/2005 | Bhaskaran et al. .......... 713/176 |
| 2006/0259516 | A1* | 11/2006 | Stakutis et al. .............. 707/200 |

OTHER PUBLICATIONS

"Rename Page", "Illegal Character Editor", "Main Editor", "Options Panel", "URL Editor", "Metadata Attribute List/Cross Reference", from the Index of HelpFile of version 2.9 of Mp3 Tag Clinic.

Suel T et al: "Compressing the graph structure of the Web" Data Compression Conference, Proceedings. DCC, IEEE Computer Society Press, Los Alamitos, CA, US, 2001, pp. 213-222 XP002285665.

Vanzyl A J et al: "Open Hypertext System. An Examination of Requirements, and Analysis of Implentation Strategies, comparing Microcosm, HyperTED, and the World Wide Web", 1994 XP002285664.

Ashman H: "Theory and Practice of Large-Scale Hypermedia Systems", 1997, pp. i-vii and pp. 26-70 XP002285663.

"X.500 Object Identifiers allocated by OpenFortress" 'Online!, Jun. 19, 2002 (2 pgs.) XP002334790.

* cited by examiner

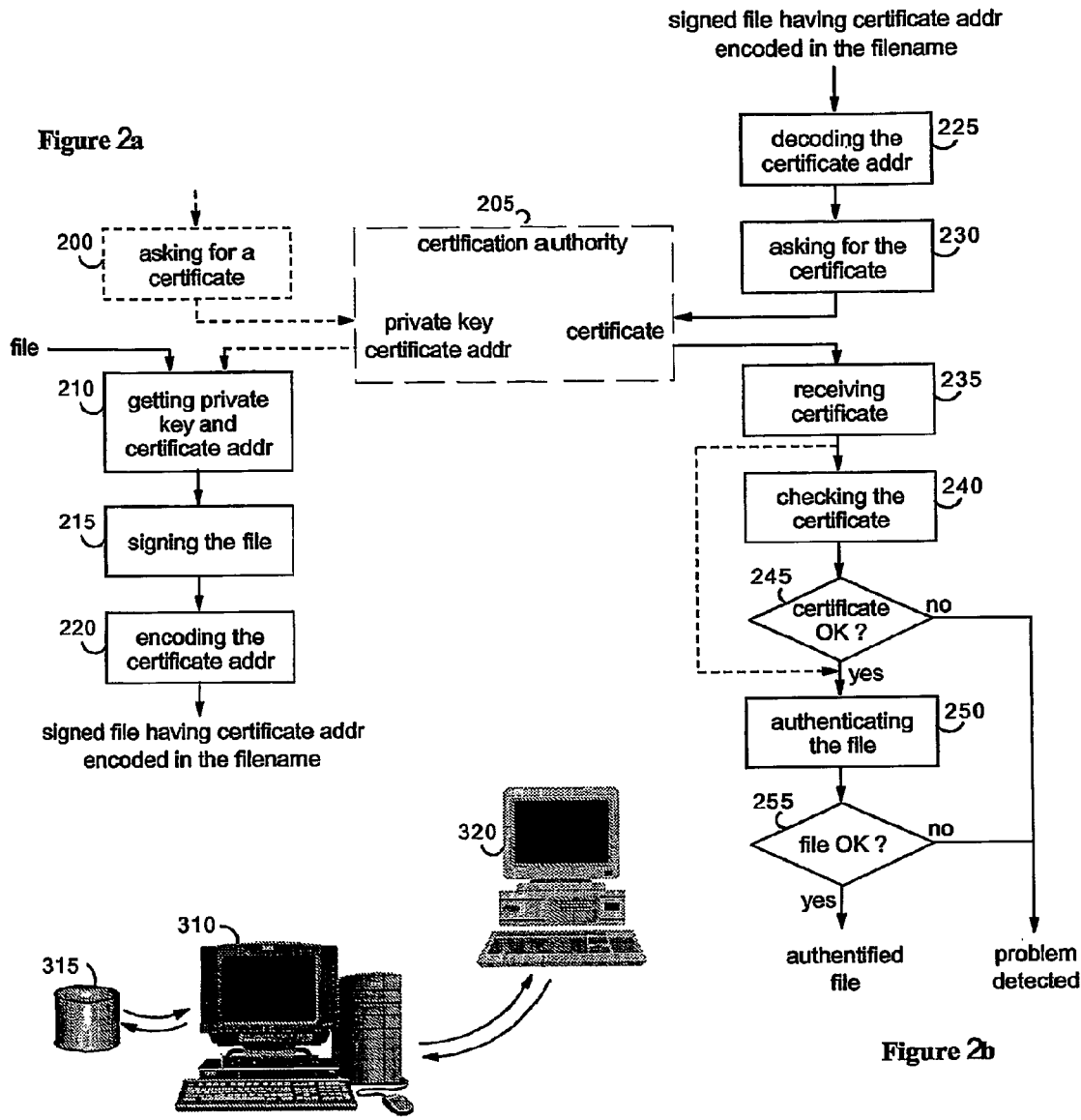
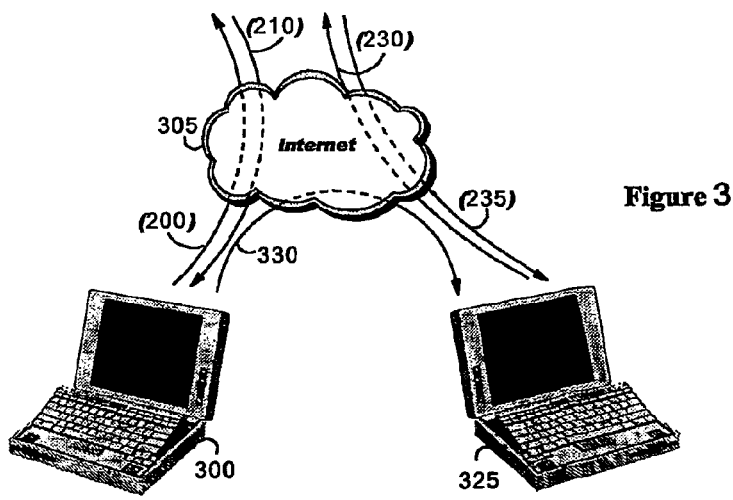

```
-----BEGIN SIGNATURE-----                                        410
Idkflkmejsdaolf344ikikrik08+kedikdflioe993+lalkfdlasd
4ksrik4Iksafj8IkadfId6lafdlfj+kdakljfl6ladfldfjl+adfsdfddf+
-----END SIGNATURE-----
```

LES TRES RICHES HEURES DU DUC DE BERRY
Lewis Carroll, WONDERLAND Project, IBM Corp.
405

WHAT IS THE TRES RICHES HEURES?
The Tres Riches Heures is the classic example of a medieval book of hours. This was a collection of the text for each liturgical hour of the day – hence the name – which often included other, supplementary, texts. Calendars, prayers, psalms and masses for certain holy days were commonly included.

The pictures in this directory are from the calendar section of the Tres Riches Heures. This was painted some time between 1412 and 1416 and is arguably the most beautiful part of the manuscript; it is certainly the best known, being one of the great art treasures of France. In terms of historical and cultural importance, it is certainly equal to more famous works such as the Mona Lisa, marking the pinnacle of the art of manuscript illumination.

WHO PAINTED THE TRES RICHES HEURES?
The Tres Riches Heures was painted by the Limbourg brothers, Paul, Hermann and Jean. They came from Nimwegen in what is now Flanders but were generally referred to as Germans. Very little is known about them; they are believed to have been born in the late 1370s or 1380s and were born into an artistic family, their father being a wood sculptor and their uncle being an artist working variously for the French Queen and for the Duc de Bourgogne.

They seem to have followed in their uncle's footsteps and by 1402 had entered into the service of the Duc de Bourgogne as artists. By 1408 they had entered the service of Jean, Duc de Berry, one of the most notable (and richest!) art lovers in France. They are known to have executed several other pieces of work apart from the Tres Riches Heures but most

415
Berry(http..((www.certauth.com(certificates(Lewis Carroll.cer).doc

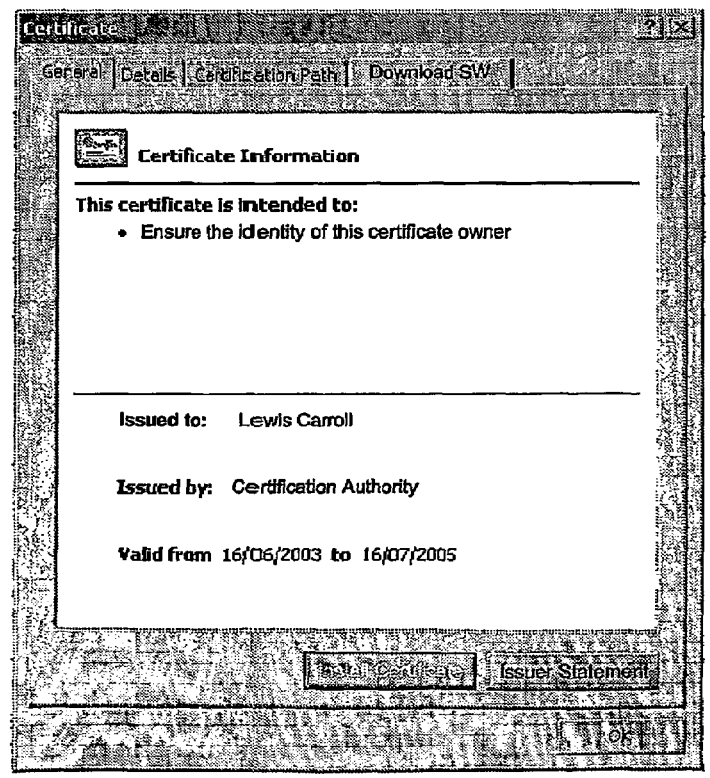

Figure 5a

METHOD AND SYSTEM FOR LINKING CERTIFICATES TO SIGNED FILES

COPYRIGHT NOTICE

A portion of the disclosure of this patent document contains material which is subject to copyright protection. The copyright owner has no objection to the facsimile reproduction by anyone of the patent disclosure, as it appears in the National Patent and Trademark Office patent file or records, but otherwise reserves all copyright rights whatsoever.

FIELD OF THE INVENTION

The present invention relates generally to network computing security and more specifically to a method and systems for linking a digital certificate to a digitally signed file that can be accessed through a network so as to provide information relative to the signer identity and the validity of the signature that can be used before opening the file.

BACKGROUND OF THE INVENTION

To improve data transmission security over computer networks and to prevent digital forgery, a digital signature is commonly used to authenticate a file i.e., to check file integrity and to authenticate signer. Such digital signature allows, for example, to control the source of a received file, and to verify the file integrity. A digital signature asserts that the user corresponding to the digital signature wrote or otherwise agreed with the contents of an electronic document or other information object to which the digital signature is appended. As with written signatures, digital signatures provide authentication of the signer's identity, acceptance of the terms stated in the signed document, proof of the integrity of the document's contents, and non repudiation (in other words, the signer cannot deny what he/she has signed). Digital signatures are generally based upon public key algorithms wherein security is provided through keys independently of the used algorithm, which may be freely published or analyzed.

A digital certificate can be considered as an attachment to a signed document, to link the identity of the signer of the document to his/her public key. A digital certificate provides a cryptographic public key that allows another party to encrypt information for the certificate's owner. A digital certificate also allows to verify that a user sending a document is who he/she claims to be, and to provide the receiver with the means to encode a reply. A certificate therefore securely identifies the owner of the public key pair, which is used to provide authentication, authorization, encryption, and non-repudiation services. A digital certificate contains the signer's public key and bears, the digital signature of a Certification Authority (CA). The most widely used standard for digital certificates is X.509, Version 3, "The Directory-Authentication Framework 1988", promulgated by the International Telecommunications Union (ITU), which defines the following structure for public-key certificates:

- version field (identifying the certificate format)
- Serial Number (unique within the CA)
- Signature Algorithm (identifying the issuer's hash and digital signature algorithms used to sign the certificate)
- Issuer Name (the name of the CA)
- Period of Validity (a pair of "Not Before", and "Not After" Dates)
- Subject Name (the name of the user to whom the certificate is issued)
- Subject's Public Key field (including Algorithm name and the Public Key of the subject)
- Extensions
- Signature of CA A certification authority is the third party that everyone trusts whose responsibility is to issue digital certificates providing the link between the signer and the signer's public key. A certification authority (CA) also keeps records about the transactions that occur using certificates it has issued. An individual wishing to sign a document applies for a digital certificate from a Certification Authority. The digital certificate is digitally signed by the issuing Certification Authority that ensures both content and source integrity. The CA makes its own public key readily available through, for example, print publicity or on the Internet. The act of digitally signing makes the certificates substantially tamperproof, and therefore further protection is not needed. The strength of protection equates directly to the strength of the algorithm and key size used in creating the issuer's digital signature (hash and digital signature algorithms).

The signature verification process checks the digital signature appended or attached to a document using the public verification key extracted from the digital certificate, issued by the CA, that must be also appended to or referenced in the document. Using the public key of the signer, the signature verification process recovers from the digital signature, the hash value, computed by the signer, in the file that was signed using the private key of the signer during the authentication process. To verify that the file is authentic, the receiver computes also the hash value of the document, and then compares the deciphered hash value with the real hash value, computed from the file. If both hash values are identical, the file is accepted as authentic, otherwise, the file is rejected as being corrupted or fake.

Once the digital signature of a file has been computed and the file has been signed with the digital signature for verification purposes, a digital certificate must be associated with the signed file to make possible the verification of the digital signature by the recipient.

Generally, a digital certificate used for authenticating a file is transmitted as a separate file, appended to the file it authenticates e.g., as part of a file wrapper structure, or alternatively, the certificate can be retrieved from a reference or address e.g., the URL of the certificate on the issuing CA Web Server.

Transmitting and maintaining digital certificates and signed documents as separate files e.g., the digital certificate associated to a signed document is stored in the user's workstation or in a server, presents the advantage of supporting file authentication at any time in a simple and well understood way. However, if documents are later passed on or moved to new recipients, associated digital certificates can be lost, accidentally removed, or even intentionally removed on the way in an attempt to cheat.

Wrapping a file with delimiters and appending the digital certificate, or the URL of said certificate on the issuing CA Web Server, at the end of the signed file is convenient, since both the certificate, or the certificate address, and the signed content travel together. Conversely, the wrapper and the certificate, or the certificate address, will typically need to be removed before the file can be used. Thus, signature validation only occurs when the document is retrieved. If the document is later passed on or moved, it may be difficult to check again, since the certificate, or the certificate address, could be lost. Furthermore, the method is not compatible with standard file formats such as image, video, audio or executable files that cannot be recognized prior to authentication.

When a recipient receives an electronic document, if the digital certificate has been appended to the signed document, the recipient must perform the following tasks:

open the electronic document;

identify and extract, from the electronic document, the digital certificate and the digital signature portions appended to this electronic document;

identify the address and contact the CA to check that the appended certificate is a valid certificate, using the digital certificate content; and, verify the signature using the public key in the certificate.

It must be observed that if the digital certificate is appended to the received electronic document, the recipient must open the document file for accessing the digital certificate required to verify the signature. Even when the certificate, instead of being appended, would be referenced e.g., as a network address or URL, in the received document, the address from which the certificate e.g., from a CA Web Server or directory archive, can be accessed or retrieved, must also be appended by the sender to the signed document. Therefore, it is also required to open the received document to get said address needed for accessing the digital certificate.

Thus, there are security problems related to the methods described above for verifying the authenticity of received or accessed files by the recipient:

when certificates are sent as separate files, the associated digital certificates could be lost if the signed files are later passed on or moved to new recipients. In such case, it is impossible to verify these signed files.

when certificates, or certificates addresses, are appended to the signed files, recipients must open and process the received files to verify said files. Before opening a received files, parsing the content for locating, and retrieving, or accessing, the associated certificate, there is no way to determine in advance, whether the received file has been signed or not i.e., whether it is an "authenticated" file or an "impersonated" file (a non-signed file). Likewise, it is impossible to determine whether or not the certificate is valid i.e., if it has been issued by a CA, if it has not been revoked, and if the certificate date is valid.

It is also to be noticed that opening files for verification represents an important security concern.

Many viruses spread on the Internet on e-mail attachments distributed as "impersonated". If a received impersonated file has been maliciously infected by a virus, opening the infected file for the simple purpose of signature verification almost surely may "open" the door for infecting the receiver's computer. This is a "security hole" common to all signature methods described above, as illustrated by operation of the class of public-key algorithms discussed herein before.

Certificates must be issued by certificate authorities. If a certificate becomes compromised, the certificate authority can later revoke the certificate, thus rendering invalid all files signed after the signature's revocation date. A certificate could become compromised if an unauthorized third-party obtained the private key associated with the certificate. This private key is typically stored on the signer's computer. With the private key, an unauthorized person could essentially forge a signature. If the recipient receives a file signed with a revoked certificate, it is must be discarded as invalid or fake.

Therefore, before opening a received file, it would be advisable to check:

if the file has been signed i.e., if it contains a digital signature and a digital certificate appended or referenced;

the issuer name i.e., the name of the CA;

the name of the user to whom the certificate has been issued; and, the validity period of the certificate.

Therefore, there is a need to provide a method and systems for accessing a digital certificate from a signed file before opening said file, so as to enable the recipient of the file to determine if the received file has been signed i.e., authenticated, and to check the identify of signer e.g., contacting the signer by e-mail, and the validity of the digital certificate before opening said file for signature verification.

SUMMARY OF THE INVENTION

Thus, it is a broad object of the invention to remedy the shortcomings of the prior art as described here above.

It is another object of the invention to provide a method and systems adapted for enabling a recipient to check whether or not a received file is a signed file, before opening said file.

It is a further object of the invention to provide a method and systems adapted to access the digital certificate of a signer, before opening the corresponding files.

It is still a further object of the invention to provide a method and systems adapted for providing the identity and address of the signer of a file to the recipient of this file so as to verify signer identity, before opening a suspicious file.

The accomplishment of these and other related objects is achieved by a method for encoding in the filename of a signed file, an address from which the certificate required to authenticate said signed file can be accessed, said method comprising the steps of, encoding said address from which the certificate required to authenticate said signed file can be accessed;

merging said filename and said encoded address in a new filename; and, renaming said signed file with said new filename, wherein said filename and said encoded addresses are separated by a control character, and by a method for authenticating a signed file having a filename wherein an address from which the certificate required to authenticate this signed file can be accessed is encoded, said method comprising the steps of, extracting said encoded address;

decoding said encoded address;

accessing said certificate required to authenticate said signed file using said decoded address, authenticating said signed file using said accessed certificate.

Further advantages of the present invention will become apparent to the ones skilled in the art upon examination of the drawings and detailed description. It is intended that any additional advantages be incorporated herein.

BRIEF DESCRIPTION OF THE DRAWINGS

FIG. 1, comprising

FIG. 2, comprising FIGS. 2a and 2b, illustrates an example of the algorithm that is used to sign an electronic document and of the algorithm that is used to check the integrity and to verify the signature of a signed file, respectively.

FIG. 3 depicts an example of the environment wherein the invention can be implemented.

FIG. 4 shows an example of a signed file content wherein the filename is encoded according to the invention.

FIG. 5, comprising FIGS. 5a to 5f, illustrates an example of the user's interface when using the invention.

DETAILED DESCRIPTION OF THE PREFERRED EMBODIMENT

According to the invention, the filename of a file that is accessed locally or through a computer network is used to encode the address, or URL, from which the certificate that can be used to check the integrity and to verify the signature of the file can be accessed. A lexicography is determined so as to avoid particular characters that may be forbidden by the file system, e.g., "\" with Microsoft Windows system (Windows is a Trademark of Microsoft Corporation), and/or to encode the addresses so as to reduce their sizes. Addresses to be encoded may be of any forms e.g., local addresses, addresses in private networks or Internet addresses, however, for sake of illustration, the examples given in the following description are based on URL type of addresses. The address from which the certificate can be accessed can be encoded either when the file is transmitted from a server to the user system or when it is locally saved or transmitted to another system.

Figure 1A:
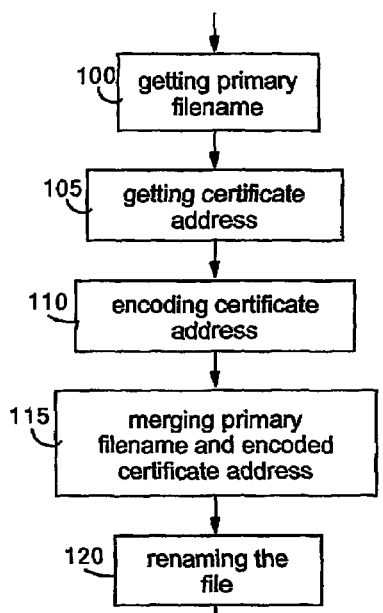
FIGS. 1a, 1b, and 1c, illustrates an example of the algorithm used for encoding, in the filename of a file, the address or URL wherein the certificate used to signed this file is stored.

FIG. 1 illustrates an example of tie algorithm used to encode a certificate address. As shown on FIG. 1a, a first step consists in getting the primary filename of the file (box 100), i.e. the filename of the file, and the address or URL of the certificate that is required to check the integrity and to verify the signature of the file, referred to as certificate address in the following description (box 105). Then, the certificate address is encoded (box 110) and merged with the primary filename of the file, using particular separators (box 115) before the file is renamed with the filename comprising the primary filename and the encoded certificate address (box 120).

Figure 1B:
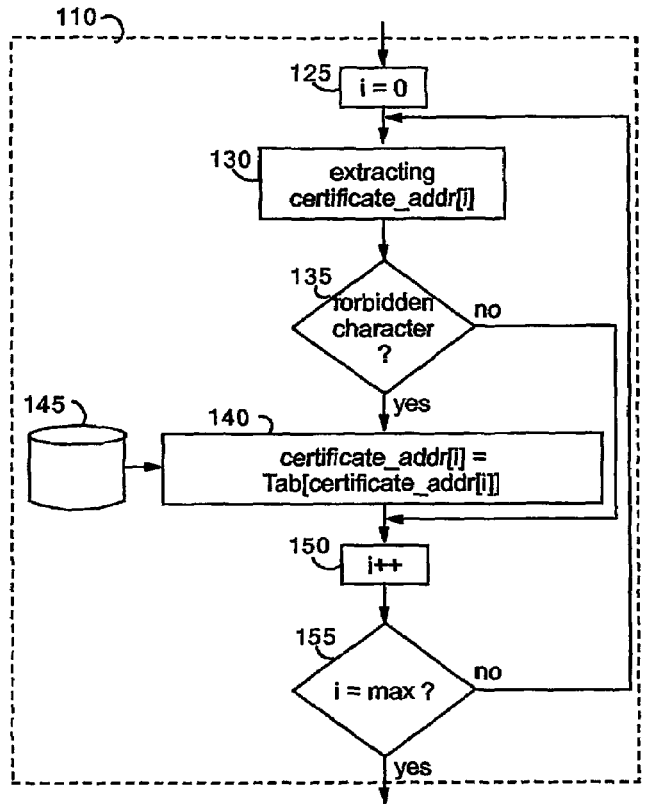

FIG. 1b depicts an example of the encoding algorithm (box 110). A variable i is set to zero (box 125) and the $i^{th}$ character is extracted from the certificate address string (box 130). A test is performed to determine whether the extracted character is valid or otherwise forbidden by filename syntax rules imposed by the file system of the user's device (box 135). If the extracted character is a filename valid character, variable i is incremented (box 150) and a test is performed to determine if variable i has reached its maximum value that is, if all characters of the certificate address string have been processed (box 155). If variable i has not reached its maximum value, the last four steps of the algorithm are repeated (boxes 130 to 155). Else, if variable i has reached its maximum value, the process is stopped. If the character extracted from the certificate address string is forbidden by the filename syntax rules, a corresponding valid character, or group of characters, is selected in lexicography table 145 and this selected character, or group of characters, replaces the forbidden one (box 140). Then variable i is incremented and the same test described before is performed to determine if variable i has reached its maximum value.

As an illustration of the algorithm described above, consider the case of a file based on Microsoft Word format (Word is a Trademark of Microsoft Corporation) named "Berry-.doc", that a user would like to send to someone else as an e-mail attachment, using to this purpose a lexicography table to encode the certificate address string into the filename, wherein ":" is associated to " . . . "

"/" is associated to "("

To check the integrity and to verify the signature of this document file, it is required to use the certificate corresponding to the private key that has been used to sign this file. For sake of illustration one can considered that this certificate can be downloaded from the following URL:

http://www.certauth.com/certificates/Lewis Carroll.cer

When the originator of the document "Berry.doc" signs the document, an option such as "Copy path to file" can be selected to encode the URL of the certificate repository wherein the certificate required to check the integrity or to verify the signature of the document can be accessed.

The filename is modified according to the algorithm illustrated on FIG. 1. Firstly, by using the previous lexicography table, the certificate repository URL is encoded as follows:

http..((www.certauth.com(certificates(Lewis Carroll.cer

Then, the encoded URL is merged with the filename. In this example, the encoded URL is enclosed in parenthesis that are used as separators. The encoded URL is inserted in front of the extension dot of the primary filename as follows:

Berry(http..((www.certauth.com(certificates(Lewis Carroll.cer).doc and the file is renamed using this modified filename.

It must be noticed that, for sake of illustration, this encoding algorithm is purposely very simple. A preferred one would consist in replacing a sequence of forbidden characters by a single one e.g., replacing "//:" by "(". Likewise, some sets of characters may be replaced by more compact codes e.g., replacing "http://" by. "H!".

Figure 1C:
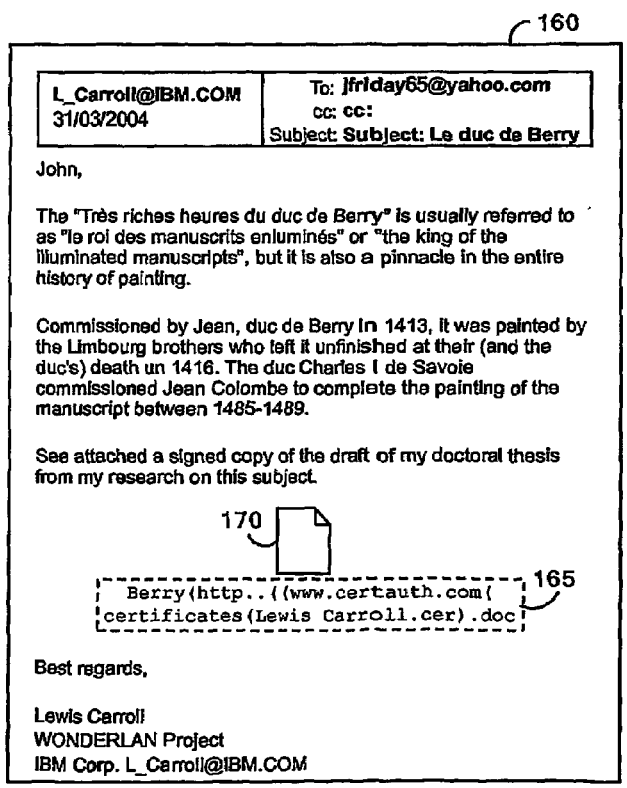

FIG. 1c depicts an e-mail 160 wherein the filename 165 of the attached file 170 has been modified to embed the URL of the certificate address according to the previous algorithm.

When the attachment of the above mentioned e-mail is selected to be processed by the receiver, a test is performed to determine whether or not the user requests an integrity check or a signature verification so as to determine whether or not the certificate address must be extracted from the filename and decoded.

Using the same table of lexicographic transformations as the one that has been used by the sender of the file to encode the certificate address, the certificate address or URL is extracted and decoded from the filename. To that end, certain symbols or groups of symbols of the "encoded URL" are replaced by symbols or characters that are compatible with URL conventions on Internet, as mentioned above, to get the decoded and valid URL. Using the same example as before, the decoded certificate address is, http://www.certauth.com/certificates/Lewis Carroll.cer Certificates are stored in a database of a certification authority server and, possibly, locally in the certificate's owner device. Each certificate comprises at least a public key that can be accessed by third parties to check the validity or to verify the signature of a signed file. The public key of a certificate corresponds to a private key that is known only by the certificate's owner and by the certification authority, this private key being used to sign files. In a preferred embodiment, the certificates also comprise additional information such as the owner's name, the certificate's validity period and the signature algorithm as mentioned above. It must be clear that a private key is only known by the certificate's owner and by the certification authority while all the other information relative to the private key and organized as a certificate is public and can be accessed by any third party knowing the certificate address or URL.

FIG. 2, comprising FIGS. 2a and 2b, illustrates an example of the algorithm that is used to sign an electronic document and of the algorithm that is used to check the integrity and/or to verify the signature of a signed file, respectively.

A computer readable medium comprises instructions adapted to perform the method pertaining to the algorithm of FIG. 2a. A computer readable medium comprises instructions adapted to perform the method pertaining to the algorithm of FIG. 2b.

If the sender has not already a certificate issued by certification authority, he/she must apply for the certification authority to issue it. This must be made one time for a validity period since a certificate has a validity period. Thus, the private key associated to a certificate issued by the certification authority can be used by the sender to sign all documents during the certificate validity period. To get a certificate the sender sends a request to the certification authority (step 200) with required information such as sender's name. After having assigned a pair of private and public keys, the certification authority creates a certificate and transmits the private key as well as the certificate address to the user having sent the request, using a secure connection. The private key and the certificate address are preferably stored locally on the user's device however, this information can be stored on a secure server of the certification authority or on personal data storage means, such as a smart card.

After having selected the file to sign and once having received or recovered the required private key and the associated certificate address (step 210), the user signs the file (step 215). To that purpose, a standard certification algorithm is used to compute a signature based on the file to be signed and the private key e.g. Message-Digest-5 (MD5) with RSA or SHA hashing algorithm with RSA.

In a preferred embodiment, the signature is appended to the document as illustrated on FIG. 4 wherein the signature (410) is located at the beginning of the file (400) and separated from the content of the document (405) by tags "BEGIN SIGNATURE" and "END SIGNATURE". Then, the address or URL of the server wherein the public key that is required to check the integrity or to verify the signature of the file is encoded in the filename (step 220) as described by reference to FIG. 1. As mentioned above, the address or URL wherein this public key is stored is preferably provided by the certification authority when issuing the certificate however, it can be transmitted to the sender, upon request, each time he/she signs a document. Therefore, at the end of the algorithm depicted on FIG. 2a, the resulting file is signed and contains a link to a server wherein a certificate may be recovered to check the integrity of the resulting file or to verify the embedded signature.

FIG. 2b illustrates an example of the algorithm that can be used to check the integrity or to verify the signature of a signed file encoded according to the invention. The first step consists in decoding the filename of the file, as described above, to retrieve the address or URL wherein the certificate that is required to check the integrity or to verify the signature is stored (step 225). Then, using this decoded address or URL, the user can access the certificate from a server, preferably controlled by a certification authority (steps 230 and 235), without opening the file. At this stage, the user can access information related to the certificate, such as the name of the person to whom the certificate has been delivered, the validity period of the certificate and the signature algorithm. Therefore, the user is able to check the certificate to determine whether or not the owner of the certificate is the one he/she expects to be (steps 240 and 245). Then, using the public key of the certificate, it is possible to authenticate the file i.e., to check the integrity of the file and/or to verify the signature (steps 250 and 255), by using a standard authentication algorithm. As suggested by dotted lines, the user can authenticate the signed file without checking the certificate. Naturally the certificate can contain information relative to the authentication algorithm that could be used, or must be used, depending upon the certification authority policy. Still in a preferred embodiment, the certification authority can provide the user means to download an authentication applet when he/she accesses the certificate so as to check the integrity and verify the signature of the file.

FIG. 3 depicts an example of the environment wherein the invention can be implemented. For sake of illustration the main steps of the algorithms described on FIGS. 2a and 2b are illustrated with referenced arrows. As described above, a user (300) who has no certificate and who wants to sign a file must access a certification authority server (310) through a network (305) e.g., Internet. Certificates generated by the certification authority (320) are locally stored in a certificate database (315) of the certification authority server (310). Likewise, when a user (325) having a signed file e.g., received as an e-mail attachment, wants to check its integrity and to verify the signature, he/she accesses through a network (305) the public key of the certificate which address or URL is encoded in the filename of the signed file to check.

FIG. 4 shows a signed file (400) comprising the document (405) and a signature (410) that can be used to check the file integrity and to verify the identity of the document's author. The address or URL of the certification authority server wherein the certificate corresponding to the private key used to sign the file is encoded and stored in the filename (415).

Figure 5B:
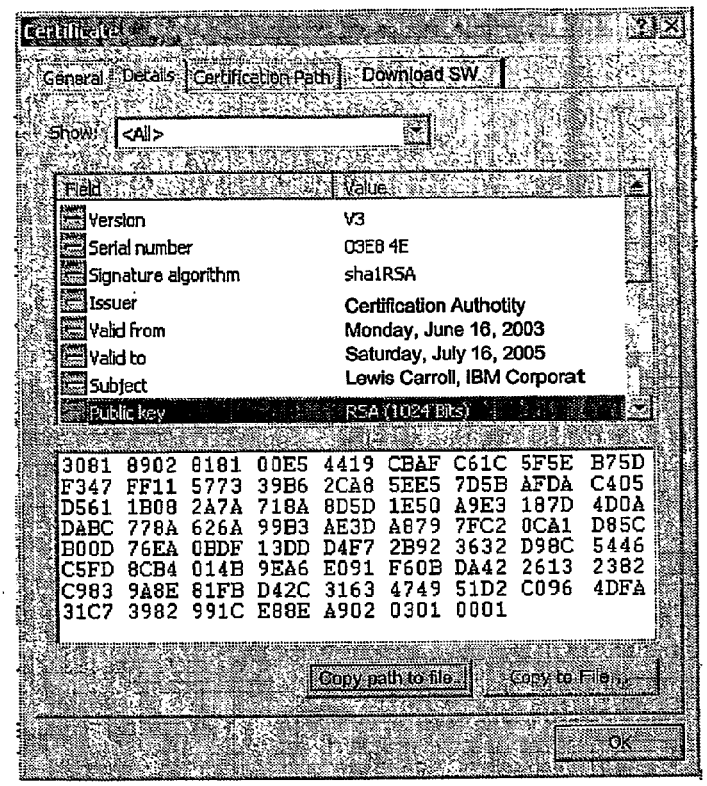
Figure 5C:
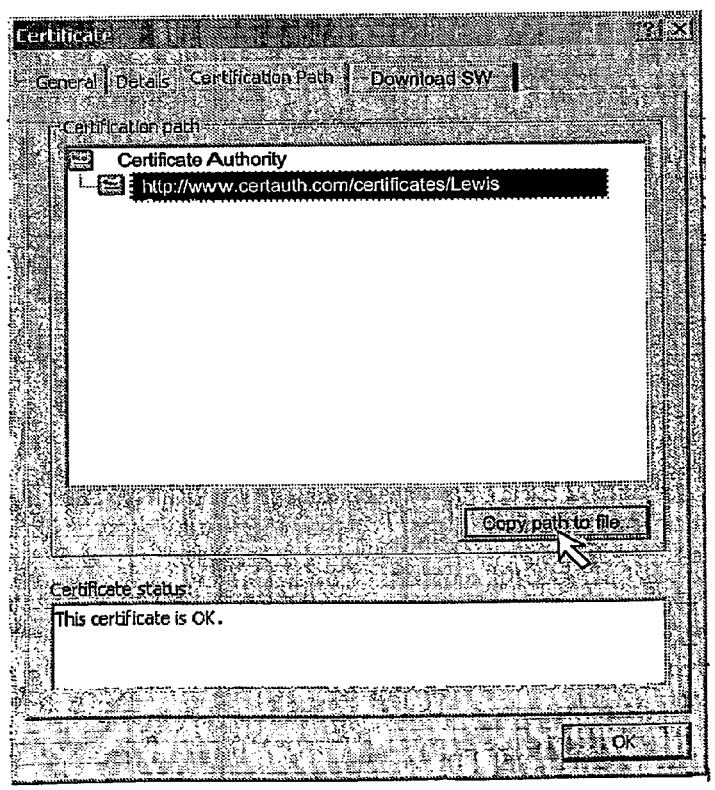
Figure 5D:
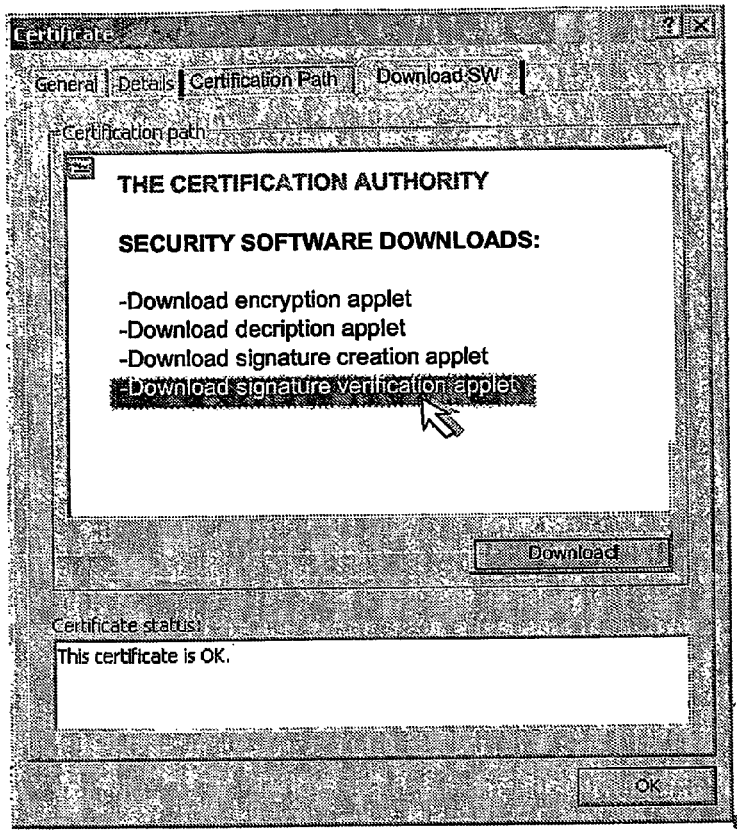
Figure 5E:
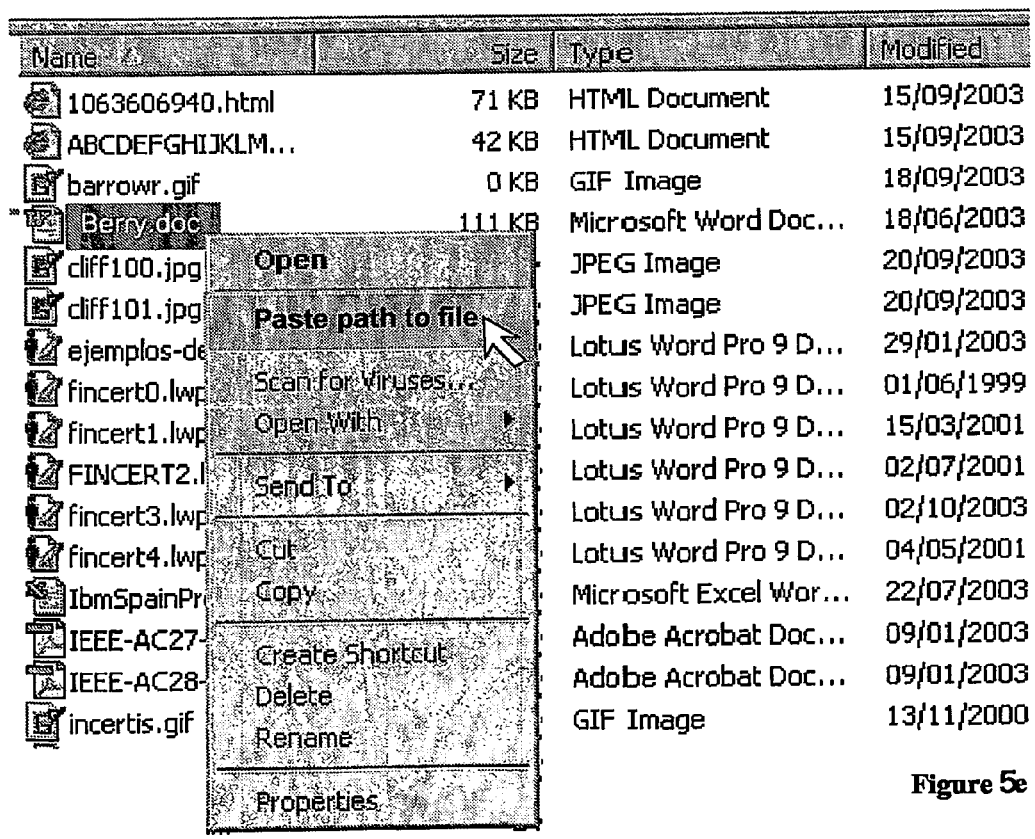
Figure 5F:
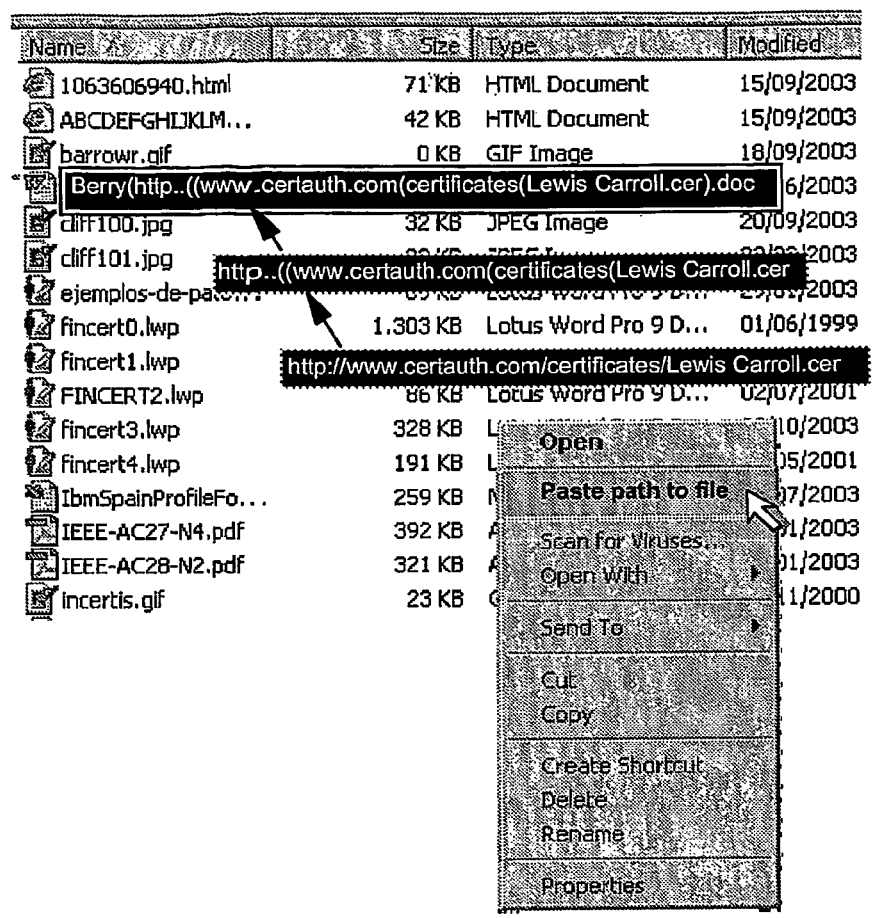

FIG. 5, comprising FIGS. 5a to 5f, illustrates an example of the user's interface when using the invention. FIGS. 5a to 5d depict an example of certificate panel while FIGS. 5e and 5f show how a certificate address or URL can be linked to a file.

The certificate panel illustrated on FIGS. 5a to 5d comprises 4 tabs depicted on each of these FIGS., respectively, these tabs comprising information relative to:
general tab:
    owner of the certificate,
    certification authority having delivered the certificate, and,
    validity period,
detail tab:
    version identifying the certificate-format,
    serial number (unique within the certification authority),
    signature algorithm (identifying the issuer's hash algorithm and digital signature algorithm used to sign the certificate),
    issuer name (the name of the certification authority),
    the beginning of the validity period,
    the end of the validity period,
    subject name (the name of the user to whom the certificate is issued),
    subject's public key field (including Algorithm name and the Public Key of the subject),
    extensions, and,
    signature of the certification authority,
certification path (address or URL of the certificate on the certification authority server), and,
download SW (comprises links software applications or applets that are adapted, for example, to check the validity of a file or to verify a signature).

Most of these fields are completed by the certification authority after having received a request for a certificate and an identifier or subject name. The private and public keys are computed according to standard algorithms.

FIGS. 5e and 5f depict an example of the interface that can be used to encode a certificate address or URL into the filename of a file. After having selected a file in the file manager, the user can click on the right button of the mouse to display a pop-up menu comprising a "Paste path to file" option. Then, the path previously memorized in the clipboard or selected by other means is encoded in the filename of the file according to the method described by reference to FIG. 1.

Naturally, in order to satisfy local and specific requirements, a person skilled in the art may apply to the solution described above many modifications and alterations all of which, however, are included within the scope of protection of the invention as defined by the following claims.

The invention claimed is:

1. A method for processing a file having an existing filename, said method comprising:
   a sender sending a request to a certification authority (CA) for a digital certificate;
   after said sending, said sender receiving from the certification authority (CA) who issued the digital certificate: a private key and a certificate address from which the digital certificate may be accessed, said private key being associated with the digital certificate;
   said sender generating a digital signature based on the file and the received private key, said digital certificate comprising a public key associated with the private key such that the generated digital signature can be verified through use of the public key;
   said sender signing the file with the generated digital signature;
   said sender encoding the received certificate address, said encoding generating an encoded address;
   said sender merging the existing filename and the encoded address to generate a new filename; and
   said sender renaming the file with the new filename.

2. The method of claim 1, wherein said encoding comprises replacing predetermined characters in the address with associated replacement characters, and wherein the predetermined characters are forbidden by the file system from being used in the new filename.

3. The method of claim 1, wherein the encoded address is denoted as A, wherein the existing filename is structured as F.E such that F and E respectively represent a first and second sequence of characters, and wherein the new filename is structured as F(A).E.

4. The method of claim 1, wherein the file comprises a document, wherein said signing the file comprises appending the generated digital signature to the file such that the generated digital signature is disposed between a beginning tag and an ending tag at the beginning of the file before the document.

5. The method of claim 1, wherein the method further comprises sending the renamed file from the owner of the digital certificate to a user.

6. The method of claim 1, wherein the certificate address is an address of a server of the certification authority such that the digital certificate is stored in the server.

7. A computer readable medium comprising instructions therein, wherein the instructions are adapted to perform the method of claim 1.

8. A system comprising:
   a computer readable medium comprising instructions therein, wherein the instructions are adapted to perform the method of claim 1; and
   means for executing said instructions to perform the method of claim 1.

9. The method of claim 1, wherein said receiving consists of said sender receiving the private key and the certificate address.

10. A method for authenticating a file having a filename that comprises an encoded address, said file comprising a digital signature that was generated based on the file and a private key, said method comprising:
    extracting the encoded address from the filename;
    decoding the extracted encoded address to generate a certificate address from which a digital certificate may be accessed, said digital certificate comprising a public key associated with the private key, said digital signature being verifiable through use of the public key;
    accessing the digital certificate from the generated certificate address,
    extracting the public key from the accessed digital certificate; and
    verifying the digital signature by executing an authentication algorithm in conjunction with the extracted public key.

11. The method of claim 10, wherein the digital certificate indicates the owner of the digital certificate, and wherein the method further comprises checking the accessed digital certificate to determine the owner of the digital certificate.

12. The method of claim 10, wherein the certificate address is an address of a server of certification authority (CA) who issued the digital certificate.

13. The method of claim 10, wherein the filename is structured as F(A).E, wherein A denotes the encoded address, and wherein F and E respectively represent a first and second sequence of characters.

14. The method of claim 10, wherein the file comprises a document, and wherein the digital signature is disposed between a beginning tag and an ending tag at the beginning of the file before the document.

15. The method of claim 10, wherein the method further comprises: prior to said extracting, receiving the file from the owner of the digital certificate.

16. The method of claim 10, wherein the digital certificate identifies the authentication algorithm.

17. A computer readable medium comprising instructions therein, wherein the instructions are adapted to perform the method of claim 10.

18. A system comprising:
    a computer readable medium comprising instructions therein, wherein the instructions are adapted to perform the method of claim 10; and
    means for executing said instructions to perform the method of claim 10.

* * * * *